United States Patent
Qin et al.

(10) Patent No.: US 10,540,621 B2
(45) Date of Patent: Jan. 21, 2020

(54) INVENTORY MIRRORING

(71) Applicant: Walmart Apollo, LLC, Bentonville, AR (US)

(72) Inventors: Zhiwei Qin, San Mateo, CA (US); Jagtej Bewli, San Mateo, CA (US); Mohan Akella, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1108 days.

(21) Appl. No.: 14/466,751

(22) Filed: Aug. 22, 2014

(65) Prior Publication Data

US 2016/0055439 A1 Feb. 25, 2016

(51) Int. Cl.
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC .............................................. G06Q 10/06315
See application file for complete search history.

(56) References Cited

U.S. PATENT DOCUMENTS 6,978,249 B1 12/2005 Beyer et al.
7,457,766 B1 11/2008 Noble et al.

(Continued)

OTHER PUBLICATIONS

Riccardo Manzini and Filippo Bindi, Strategic design and operational management optimizationof a multi stage physical distribution system, Transportation Research Part E, vol. 45, Issue 6, Nov. 2009, pp. 915-936.*

(Continued)

*Primary Examiner* — Andre D Boyce
(74) *Attorney, Agent, or Firm* — Bryan Cave Leighton Paisner LLP

(57) ABSTRACT

A method of determining an inventory mirroring plan for a set of distinct items in a fulfillment network. The fulfillment network can include a plurality of distribution centers. The method can include determining, for each distinct item of the set of distinct items and for each demand zone of a set of demand zones, a location-specific demand. The method also can include determining, for each of a number of clusters ranging from 1 to a predetermined maximum number of clusters, a k-cluster profile that partitions the plurality of distribution centers in the fulfillment network into k distribution center clusters. The method further can include determining, for each of the number of clusters and for each demand zone of the set of demand zones, a closest distribution center cluster of the k distribution center clusters that is nearest to the demand zone. The method also can include determining, for each of the number of clusters and for each demand zone of the set of demand zones, an average zone distance from the demand zone to the closest distribution center cluster. The method further can include determining a solution value of the number of clusters for each distinct item that minimizes a sum of a total shipping cost of each distinct item, subject to a total distinct item capacity of the plurality of distribution centers in the fulfillment network.

20 Claims, 9 Drawing Sheets

(56) References Cited

U.S. PATENT DOCUMENTS

| | | | |
|---|---|---|---|
| 7,747,543 B1* | 6/2010 | Braumoeller | G06Q 10/083 705/330 |
| 8,065,172 B2 | 11/2011 | Mauthe et al. | |
| 8,103,538 B2 | 1/2012 | Bamberg et al. | |
| 8,121,876 B1 | 2/2012 | Braumoeller et al. | |
| 8,131,581 B1 | 3/2012 | Pang et al. | |
| 8,224,688 B2 | 7/2012 | Ayres de Castro et al. | |
| 8,255,266 B1 | 8/2012 | Pang et al. | |
| 8,359,229 B2 | 1/2013 | Bateni et al. | |
| 8,374,922 B1 | 2/2013 | Antony | |
| 8,392,228 B2 | 3/2013 | Mulukutla et al. | |
| 8,407,096 B2 | 3/2013 | Mathe et al. | |
| 8,620,707 B1* | 12/2013 | Belyi | G06Q 10/087 705/28 |
| 8,626,333 B2* | 1/2014 | Waddington | G06F 17/30902 235/375 |
| 8,732,039 B1 | 5/2014 | Chen et al. | |
| 2002/0156667 A1 | 10/2002 | Bergstrom | |
| 2003/0208392 A1* | 11/2003 | Shekar | G06Q 10/06 705/7.22 |
| 2005/0288993 A1 | 12/2005 | Weng et al. | |
| 2006/0085246 A1 | 4/2006 | Li | |
| 2006/0085296 A1* | 4/2006 | Strickland | G06Q 10/087 705/28 |
| 2006/0136237 A1* | 6/2006 | Spiegel | G06Q 10/08 705/330 |
| 2007/0112647 A1* | 5/2007 | Borders | G06Q 10/0631 705/7.35 |
| 2008/0162270 A1 | 7/2008 | Kim et al. | |
| 2011/0246636 A1 | 10/2011 | Regli et al. | |
| 2012/0030070 A1* | 2/2012 | Keller | G06Q 10/087 705/28 |
| 2012/0284083 A1 | 11/2012 | Wu et al. | |
| 2013/0166468 A1* | 6/2013 | Vogelgesang | G06Q 10/087 705/330 |
| 2014/0122180 A1 | 5/2014 | Chan | |
| 2014/0257928 A1* | 9/2014 | Chen | G06Q 10/063 705/7.31 |
| 2015/0039395 A1* | 2/2015 | Denslow, III | G06Q 30/00 705/7.35 |

OTHER PUBLICATIONS

Shu-Hsien Liaoa, Chia-Lin Hsiehb, and Peng-Jen Lai, An evolutionary approach for multi-objective optimization of the integrated location—inventory distribution network problem in vendor-managed inventory, Expert Systems with Applications vol. 38, Issue 6, Jun. 2011, pp. 6768-6776.*

L. Rigouste, O. Cappe, and F. Yvon. Inference and evaluation of the multinomial mixture model for text clustering. Information processing & management, 43(5): 1260-1280, 2007. (http://arxiv.org/pdf/cs/0606069v1.pdf).

Andres Catalan & Marshall L. Fisher, Assortment Allocation to Distribution Centers to Minimize Split Customer Order—(http:///www.wharton.upenn.edu/bakerretail/files/AndresCatalan-SplitOrders.pdf), Dec. 11, 2012.

* cited by examiner

INVENTORY MIRRORING

TECHNICAL FIELD

This disclosure relates generally to product distribution systems, and relates more particularly to managing inventory across a fulfillment network of distribution centers.

BACKGROUND

Online retail has become mainstream, which has allowed customers to order an increasing number of products online and receive direct shipments of the items they order. These products are shipped from warehouses known as distribution centers. Although an online retailer may market and sell many distinct items, known as stock keeping units (SKUs), each distribution center generally has a limited capacity and, thus, can carry only a limited number of SKUs. As such, stocking every SKU at every distribution center is generally unfeasible. Inventory mirroring concerns the problem of deciding the number of distribution centers at which each SKU should be stocked. Inventory mirroring is an important problem in supply chain management for online retailers, as inventory mirroring strategies can have a profound impact on the fulfillment costs and the speed of delivering customers' orders.

BRIEF DESCRIPTION OF THE DRAWINGS

To facilitate further description of the embodiments, the following drawings are provided in which.

Figure 1:
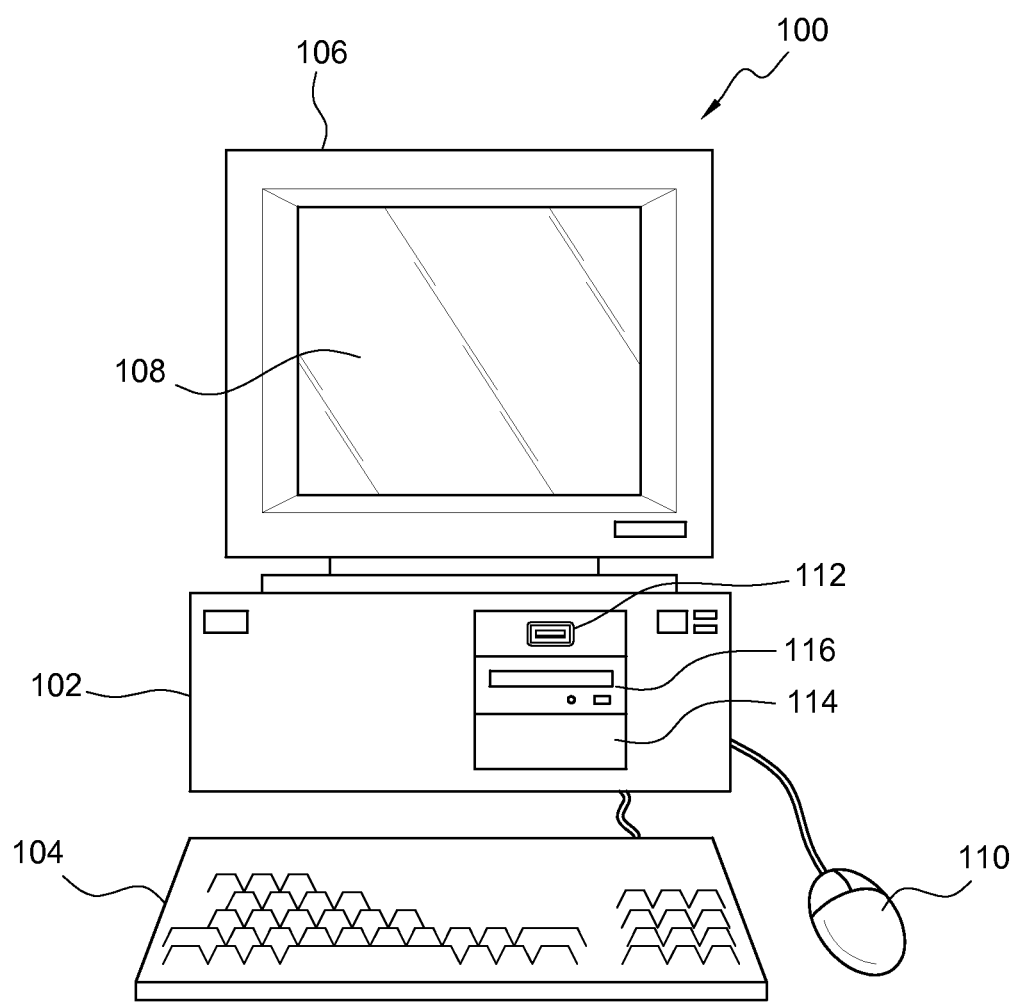
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method of determining an inventory mirroring plan for a set of distinct items in a fulfillment network. The fulfillment network can include a plurality of distribution centers. The method can be implemented at least in part via execution of computer instructions configured to run at one or more processing modules and configured to be stored at one or more non-transitory memory storage modules. The method can include determining via the one or more processing modules, for each distinct item (i) of the set of distinct items and for each demand zone (z) of a set of demand zones, a location-specific demand ($d_{i,z}$). The method also can include determining via the one or more processing modules, for each of a number of clusters (k) ranging from 1 to a predetermined maximum number of clusters (K), a k-cluster profile that partitions the plurality of distribution centers in the fulfillment network into k distribution center clusters. The method further can include determining via the one or more processing modules, for each of the number of clusters (k) ranging from 1 to the predetermined maximum number of clusters (K) and for each demand zone (z) of the set of demand zones, a closest distribution center cluster of the k distribution center clusters that is nearest to the demand zone (z). The method also can include determining via the one or more processing modules, for each of the number of clusters (k) ranging from 1 to the predetermined maximum number of clusters (K) and for each demand zone (z) of the set of demand zones, an average zone distance ($l^{(k)}(z)$) from the demand zone (z) to the closest distribution center cluster. The method further can include determining via the one or more processing modules a solution value of the number of clusters (k) for each distinct item (i) that minimizes a sum of a total shipping cost ($c_i^{(k)}$) of each distinct item (i), subject to a total distinct item capacity (M) of the plurality of distribution centers in the fulfillment network. The method also can include stocking the plurality of distribution centers based at least in part on one or more of the solution values.

Figure 2:
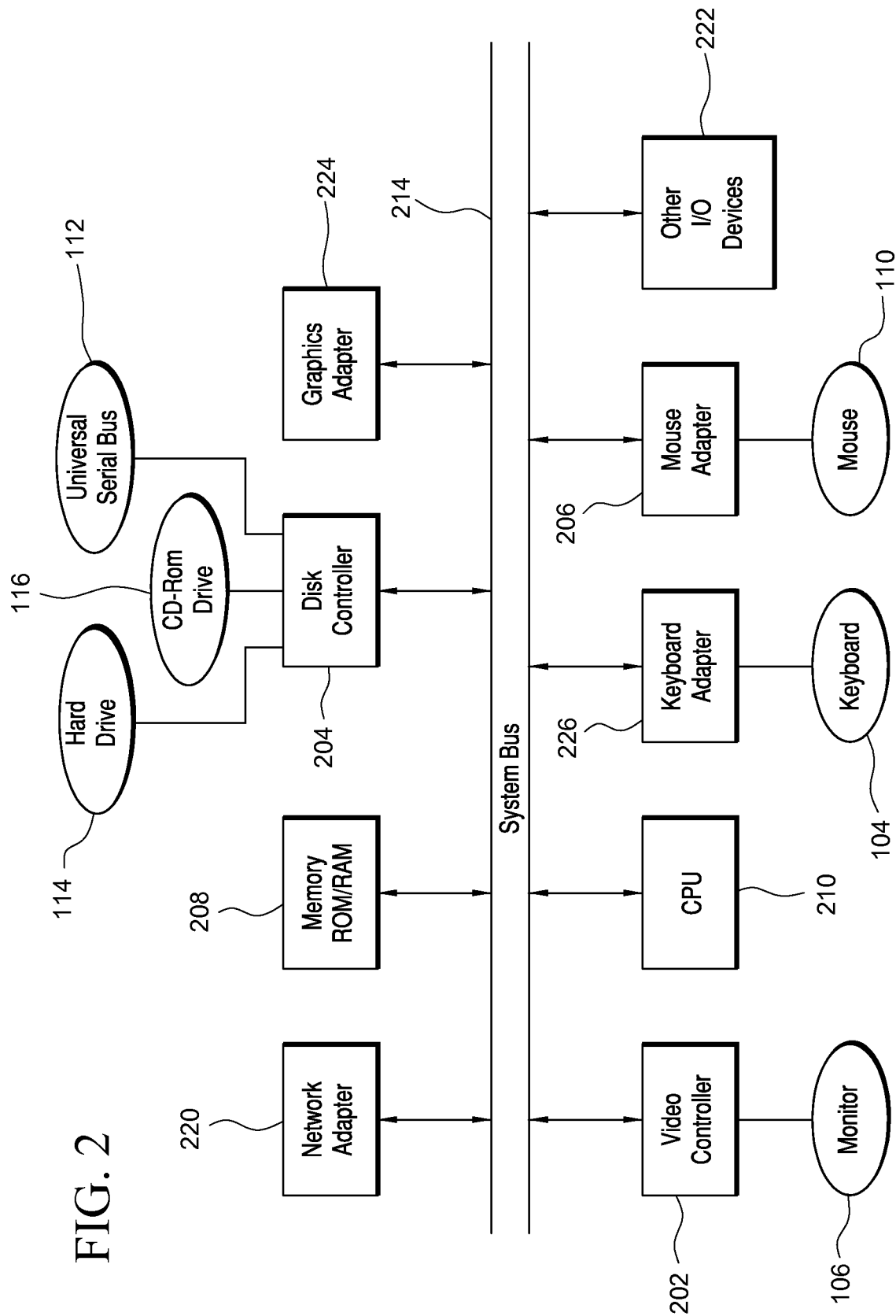
FIG. 2 illustrates a representative block diagram of an example of the elements included in the circuit boards inside a chassis of the computer system of FIG. 1.

A number of embodiments, include a system for determining an inventory mirroring plan for a set of distinct items in a fulfillment network. The fulfillment network can include a plurality of distribution centers. The system can include one or more processing modules. The system also can include one or more non-transitory memory storage modules storing computing instructions configured to run on the one or more processing modules and certain acts. The acts can include determining, for each distinct item (i) of the set of distinct items and for each demand zone (z) of a set of demand zones, a location-specific demand ($d_{i,z}$). The acts also can include determining, for each of a number of clusters (k) ranging from 1 to a predetermined maximum number of clusters (K), a k-cluster profile that partitions the plurality of distribution centers in the fulfillment network into k distribution center clusters. The acts further can include determining, for each of the number of clusters (k) ranging from 1 to the predetermined maximum number of clusters (K) and for each demand zone (z) of the set of demand zones, a closest distribution center cluster of the k distribution center clusters that is nearest to the demand zone (z). The acts also can include determining, for each of the number of clusters (k) ranging from 1 to the predetermined maximum number of clusters (K) and for each demand zone (z) of the set of demand zones, an average zone distance ($l^{(k)}(z)$) from the demand zone (z) to the closest distribution center cluster. The acts further can include determining a solution value of the number of clusters (k) for each distinct item (i) that minimizes a sum of the total shipping cost ($c_i^{(k)}$) of each distinct item (i), subject to a total distinct item capacity (M) of the plurality of distribution centers in the fulfillment network Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
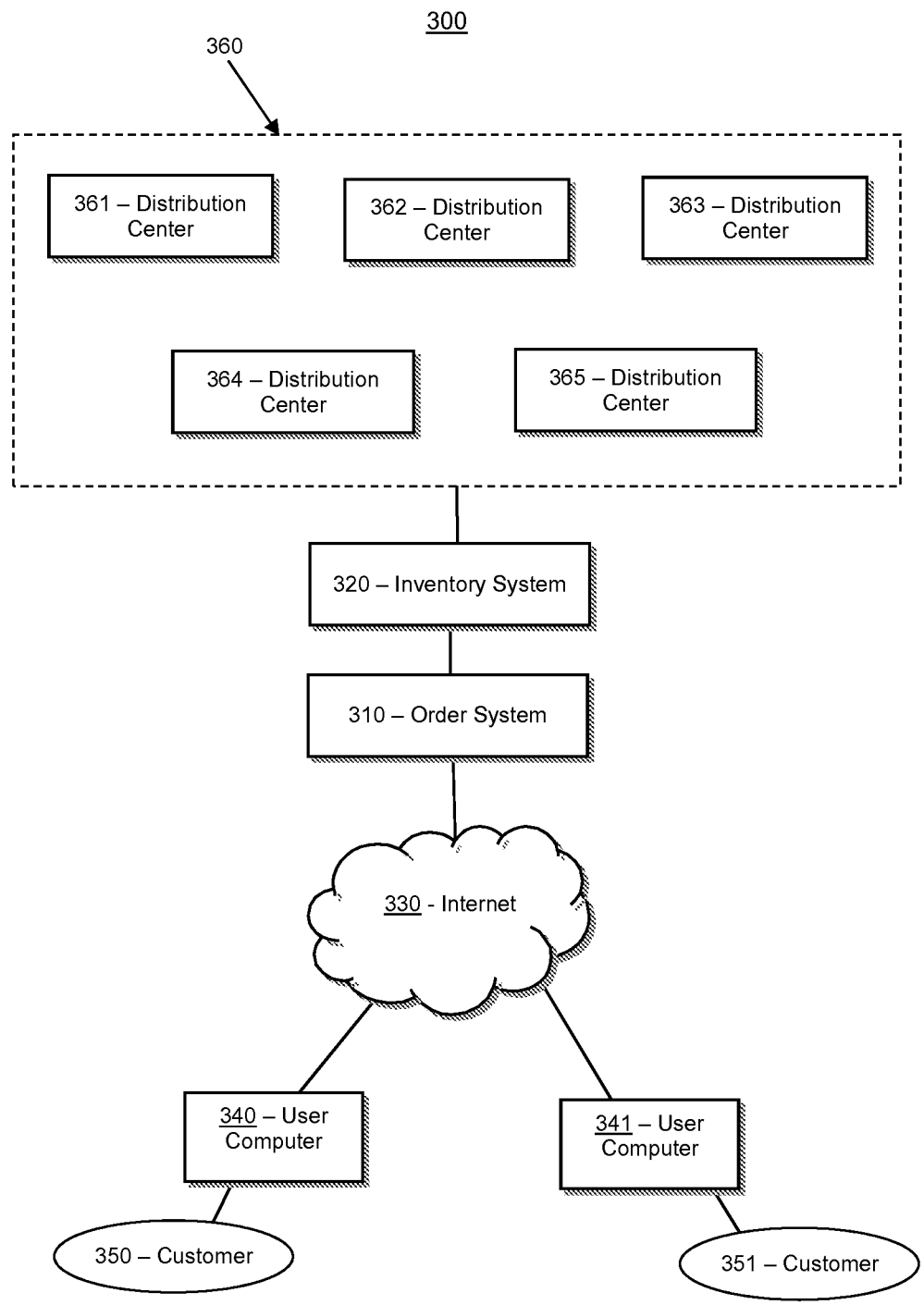
FIG. 3 illustrates a block diagram of an exemplary online retail system, portions of which can be employed for determining an inventory mirroring plan, according to an embodiment.

Turning ahead in the drawings, FIG. 3 illustrates a block diagram of an exemplary online retail system 300, portions of which can be employed for determining an inventory mirroring plan, according to an embodiment. Online retail system 300 is merely exemplary of a system in which an online retailer can receive and fulfil online orders, and embodiments of the online retail system and elements thereof are not limited to the embodiments presented herein. The online retail system and elements thereof can be employed in many different embodiments or examples not specifically depicted or described herein. In some embodiments, certain elements or modules of online retail system 300 can perform various procedures, processes, and/or activities. In other embodiments, the procedures, processes, and/or activities can be performed by other suitable elements or modules of online retail system 300.

In a number of embodiments, online retail system 300 can include a fulfillment network 360. In various embodiments, fulfillment network 360 can include one or more distribution centers, such as distribution centers 361, 362, 363, 364, and 365. In various embodiments, there can be 10, 15, 20, 30, 40, 50, or another suitable number of distribution centers. In some embodiments, online retail system 300 can include an order system 310 and/or an inventory system 320. Inventory system 320 and/or order system 310 can each be a computer system, such as computer system 100 (FIG. 1), as described above, and can each be a single computer, a single server, or a cluster or collection of computers or servers, or a cloud of computers or servers. In some embodiments, inventory system 320 can track the distinct items (e.g., stock keeping units (SKUs)) which can be ordered through the online retailer and which can be housed at the distribution centers (e.g., 361-365) of fulfillment network 360.

In many embodiments, inventory system 320 can be in data communication with order system 310. In certain embodiments, inventory system 320 and order system 310 can be separate systems. In other embodiments, inventory system 320 and order system 310 can be a single system. In various embodiments, order system 320 can be in data communication through Internet 330 with user computers (e.g., 340, 341). User computers 340-341 can be desktop computers, laptop computers, smart phones, tablet devices, and/or other endpoint devices, which can allow customers (e.g., 350-351) to access order system 320 through Internet 330. In various embodiments, order system 320 can host one or more websites, such as through one or more web servers. For example, order system 320 can host an eCommerce website that can allow customers (e.g., 350, 351) to browse and/or search for products, to add products to an electronic shopping cart, and/or to purchase products by completing an online order, in addition to other suitable activities.

In various embodiments, an online order for an item submitted by a customer (e.g., 350, 351) can result in a shipment to the customer (e.g., 350, 351) from one of the distribution centers (e.g., 361-365), such as the distribution center that has the item stocked in its inventory and that is located the closest to the delivery address of the customer (e.g., 350, 351) that submitted the online order. In several embodiments, one or more of the distribution centers (e.g., 361-365) can each have a limited capacity and can carry some of the SKUs, but not all of the SKUs, that are available for sale through order system 310. As such, stocking every SKU at every distribution center (e.g., 361-365) can be unfeasible, and the SKUs can instead be mirrored strategically. For example, the SKUs can be mirrored to stock the inventory of each SKU as close as possible to specific customer locations, subject to constraints, such as limited capacity of the distribution centers (e.g., 361-365). In some embodiments, various factors can determine the cost of shipping a SKU, such as demand volume, shipping cost sensitivity, weight, geo-demand distribution, the number of distribution centers (e.g., 361-365), and/or the capacity of the distribution centers (e.g., 361-365). For example, if a SKU has low sales volume (a "low-velocity" SKU) or very regional demand spread, it cannot necessarily warrant a high mirroring because the additional fulfillment cost and time can be small. By contrast, a SKU having high sales volume (a "high-velocity" SKU) with wide geo-demand spread can be stocked at more distribution centers (e.g., 361-365) in order to deliver the ordered inventory of the SKU within a predetermined time and/or to meet other service-level targets. In many embodiments, inventory system 320 can determine how many distribution centers (e.g., 361-365) at which to mirror each distinct item (e.g., SKU).

In some embodiments, shipping from the distribution centers (e.g., 361-365) to customers (e.g., 350, 351) can be based on a shipping zone system. The shipping zone system can be a representation of shipping distance. For example, a package shipped within the same city can be a 2-zone shipment, whereas a cross-continental shipping can be an 8-zone shipment. In many embodiments, a rate card is a price list of shipping offered by a carrier. The shipping zone distance can represented by zone distance (l). In a number of embodiments, a rate card can state a unit shipping cost for a given combination of zone distance (l) and a weight (w) of the shipped item. The rate card can be a table function c(l, w) that returns the unit shipping cost.

In many embodiments, determination of an inventory mirroring plan by inventory system 320 can be based on one or more assumptions. For example, fulfillment network 360 can be well established, and the number and locations of the distribution centers (e.g., 361-365) can have good geographic coverage such that mirroring decisions can be meaningful. As another example, the inventory holding cost can be insignificant compared to shipping cost.

In many embodiments, order system 320 can make available for sale a set of distinct items (e.g., SKUs), each of which can be represented by distinct item (i). In some embodiments, the set of distinct items can be each SKU in the catalog of items sold through order system 320. In a number of embodiments, the set of distinct items can be a subset of the catalog, such as general merchandise items, which can exclude such items as clothes, jewelry, tissue paper, etc. In a number of embodiments, an overall approach can be to solve for optimal inventory mirroring as a Knapsack-type problem. The distinct items can be analogous to the items to be put into a bag, which can be analogous to the overall capacity of the distribution centers (e.g., 361-365) in fulfillment network 360, which can have a finite capacity. There can be a cost (or value) associated with each distinct item (i) for each mirroring factor, which can represent the number of the distribution center (e.g., 361-365) in fulfillment network 360 to stock with distinct item (i). The objective can be to minimize the total cost, while staying with the total capacity of fulfillment network 360. Hence, the "value" of mirroring a distinct item (i) in a selected number of distribution centers (e.g., 361-365) can be the negative of the expected resulting optimal shipping cost for fulfilling the overall demand of the distinct item (i), assuming cost is represented as a negative value. A challenging component of this framework can be to determine the costs. Computing the exact optimal fulfillment cost associated with a given distinct item (i) and mirroring factor combination can be intractable and/or impossible when there are a very large number of distinct items (i) and/or a large number of distribution centers (e.g., 361-365), and so certain approximations can be used.

In some embodiments, each location can be represented by a demand zone (z), which can collectively comprise a set of demand zones that cover a geographical area, such as the contiguous United States. For example, each demand zone (z) can represent each distinct three-digit zip code (e.g., the first three digits of the five-digit zip code) in the contiguous United States. In other embodiments, the three-digit zip codes can be clustered into a smaller number of demand zones, such as 125 demand zones, as described in U.S. patent application Ser. No. 14/466,239, filed Aug. 22, 2014, which is incorporated herein by reference in its entirety.

In a number of embodiments, a total demand for a distinct item (i) across fulfillments network 360 can be represented by $d_i$. In various embodiments, geo-demand distribution can be data that specifies the geographical spread of customer demand for each distinct item (i). Specifically, each distinct item (i) can be associated with a distribution vector whose elements can represent the percentage of demand for a particular geographical location. In various embodiments, the demand distribution can be based on the demand from the previous year, or in other words, time-static. The time-static geo-demand distribution for distinct item (i) at demand zone (z) can be denoted by $\beta_{i,z}$. In a number of embodiments, $\Sigma_z \beta_{i,z}=1$. In several embodiments, this demand distribution data can be estimated by a number of machine learning and/or statistical methods, such as a Bayesian approach described in U.S. patent application Ser. No. 14/466,239, filed Aug. 22, 2014. With the estimation of the time-static geo-demand distributions ($\beta_{i,z}$), in several embodiments of a location-specific demand ($d_{i,z}$), $d_{i,z}=d_i \beta_{i,z}$.

In many embodiments, to minimize the cost of shipping the distinct items (i), with the distinct items (i) being mirrored across a various numbers of distribution centers (e.g., 361-365), inventory system 320 can select a number of distribution centers (e.g., 361-365) from fulfillment network 360 for each of distinct item (i) that will minimize the cost of shipping. For example, a first distinct item can be mirrored at 5 distribution centers, a second distinct item can be mirrored at 10 distribution centers, etc. The selection of the number of distribution centers for each of the distinct items (i) can be combinatorial in nature and can be computationally intractable. To remove this intractability, inventory system 320 can cluster the distribution centers (e.g., 361-365) into distribution center clusters for each of the possible mirroring selections. For example, inventory system 320 can determine a 1-cluster profile, a 2-cluster profile, a 3-cluster profile, and so forth, to a predetermined maximum number of clusters (K). For example, in some embodiments, the predetermined maximum number of clusters (K) can be 10, 15, 20, or another suitable number. For example, in one embodiments, the clustering can reduce the number of warehouses from 33 down to a maximum of 12 clusters. For a number of clusters (k), the k-cluster profile can be a segmentation of the distribution centers (e.g., 361-365) into k distribution center clusters. The distribution center clustering approximation can work generally well if the geo-demand spread of a distinct item (i) is not particularly skewed.

In many embodiments, inventory system 320 can use a conventional k-medoid clustering algorithm to cluster the distribution centers (e.g., 361-365) into k distribution center clusters. The k-medoid clustering algorithm can be more robust than a k-means clustering algorithm. An additional advantage of using the k-medoid can be that the center of each distribution center cluster can be an actual distribution center (e.g., 361-365). In a number of embodiments, the features for clustering in the k-medoid clustering algorithm can be the zone distance (l) from the distribution center (e.g., 361-365) to each demand zone (z). In a number of embodiments, inventory system 320 can determine and maintain k-cluster profile for up to K clusters. In many embodiments, each k-cluster profile can represent a clustering of the distribution centers (e.g., 361-365) into k distribution center clusters. In several embodiments, for each demand zone (z), inventory system 320 can determine a closest distribution center cluster in each k-cluster profile, which can be represented by $p^{(k)}(z)$. In many embodiments, inventory system 320 can determine the distance from demand zone (z) to the closest distribution center cluster by computing by an average zone distance ($l^{(k)}(z)$) from demand zone (z) to the distribution centers (e.g., 361-365) in the closest distribution center cluster ($p^{(k)}(z)$).

Figure 4:
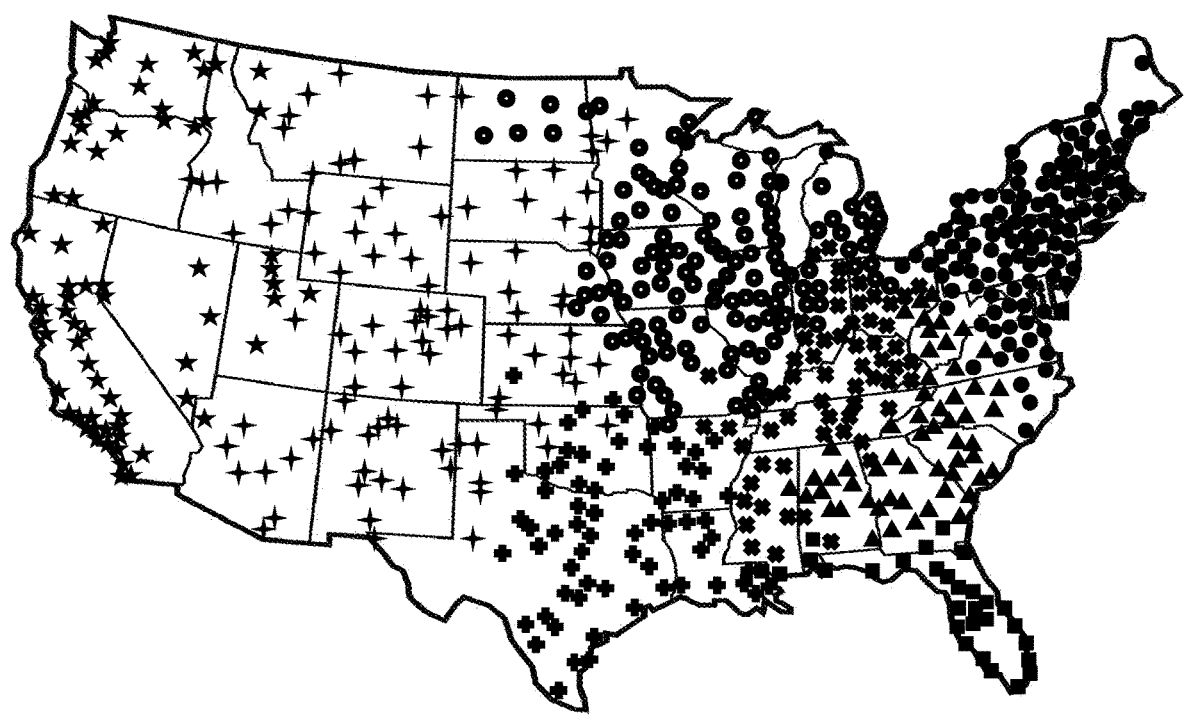
FIG. 4 illustrates an exemplary map of the contiguous United States showing a greedy demand assignment of demand zones for 8 distribution center clusters.

In several embodiments, part of developing a good inventory mirroring plan can be determining the value of stocking a distinct item (i) at a particular number of distribution centers clusters. In a number of embodiments, for each distinct item (i) and for each possible number of k distribution center clusters, inventory system 320 can determine a total shipping cost $c_i^{(k)}$ of fulfilling the demand over all of the demand zones. Solving exactly the number of distribution centers at which to mirror a distinct item (i) in order to minimize the total shipping cost given the time-static geo-demand distributions ($\beta_{i,z}$) of each distinct item (i) at each demand zone (z) can be nondeterministic polynomial-time NP-hard in general, which can be intractable, even assuming distribution centers with extra capacity and a time-static geo-demand distribution. As such, inventory system 320 can approximate the total shipping cost $c_i^{(k)}$ using the k distribution center clusters. For tractably computing an approximate total shipping cost for mirroring a distinct item (i) in k distribution center clusters, inventory system 320 can first greedily assign the demand at each demand zone (z) to the closest distribution center cluster, as described above. For example, FIG. 4 illustrates a map of the contiguous United States showing a greedy demand assignment of the demand zones (z) for 8 distribution center clusters. Each item on the map represents a demand zone (z), and is a location of a representative zip code of the demand zone (z). A shown in FIG. 4, each demand zone (z) is assigned to one of 8 distribution center clusters, which are each represented by a different shape. Note that if the distribution centers have extra capacity, this greedy scheme can be optimal at the cluster level.

In several embodiments, inventory system 320 (FIG. 3) can compute the total shipping cost for each distinct item (i) over k distribution center clusters by $c_i^{(k)} = \Sigma_z d_{i,z} c(l^{(k)}(z), w_i)$, where $w_i$ is the shipping weight of distinct item (i). In many embodiments, inventory system 320 (FIG. 3) can compute a solution value of the number of clusters (k) that minimizes a sum of a total shipping cost ($c_i^{(k)}$) of each distinct item (i), subject to a total distinct item capacity (M). The solution value for each distinct item (i) can be the mirroring factor used for distinct item (i). Each of the distribution centers (e.g., 361-365 (FIG. 3)) in fulfillment network 360 (FIG. 3) can have a distinct item capacity, and/or each of the distinct item capacities can be totaled to compute a total distinct item capacity (M).

In many embodiments, inventory system 320 (FIG. 3) can determine the solution value of the number of clusters (k) for each distinct item (i) by solving an integer programming formulation. For example, a binary variable for whether or not to mirror distinct item (i) in k distribution center clusters can be represented by $x_i^{(k)}$. In many embodiments, because only one mirroring decision can be made for each distinct item (i), $\Sigma_{k=1}^{K} x_i^{(k)} = 1$. The approximate optimal shipping cost resulting from stocking distinct item (i) at k distribution center clusters can be $c_i^{(k)}$, as described above. The total number of slots that can be occupied in the k distribution center clusters can be $\Sigma_{i=1}^{N} \Sigma_k^{K} k x_i^{(k)}$, which can be capped by the total distinct item capacity (M) of fulfillment network 360 (FIG. 3). In many embodiments, the number of distinct items (i) in the set of distinct items can be represented by N. In many embodiments, the goal of solving this problem can be to minimize the sum of the total shipping cost of each distinct item (i) subject to the above constraints. The integer programming formulation can be formally stated as follows:

$$\min_x \sum_{i=1}^{N} \sum_{k}^{K} c_i^{(k)} x_i^{(k)} \quad (1)$$

subject to:

$$\sum_{k=1}^{K} x_i^{(k)} = 1, \text{ for each } i = 1, \ldots, N$$

$$\sum_{i=1}^{N} \sum_{k}^{K} k x_i^{(k)} \leq M$$

$$x_i^{(k)} \in \{0, 1\}$$

In many embodiments, inventory system 320 (FIG. 3) can determine the values of $x_i^{(k)}$ in formulation 1 that satisfy the integer programming formulation. For each distinct item (i), the value of k in which $x_i^{(k)}$ is 1 can be the number of distribution center clusters in which to mirror distinct item (i), or in other words, the mirroring factors for distinct item (i). In many embodiments, inventory system 320 (FIG. 3) can solve formulation 1 using an optimization solver, such as Gurobi, or another suitable optimization solver. In many embodiments, inventory system 320 (FIG. 3) can determine the solution value of the number of clusters (k) for each distinct item (i) that minimizes the sum of the total shipping cost ($c_i^{(k)}$) of each distinct item (i), subject to the total distinct item capacity (M) of fulfillment network 360 (FIG. 3).

As described above, inventory system 320 (FIG. 3) can determine the solution values based on shipping cost. As a result, there can be cases in which light-weight items can be assigned low mirroring even though their selling velocity (e.g., sales volume) can be quite high because the incremental cost saving can be small compared to that for other heavier items. This can be reasonable from a cost perspective, but can be undesirable from a time-in-transit (TNT) perspective. In various embodiments of fulfillment network configurations, there can be a lower bound on the number of mirrored distribution center clusters for the demand of a distinct item (i) to be fulfilled through shipping within a time limit, e.g., two days. This lower bound on the number of distribution center clusters can be denoted by $K_{TNT}$. In some embodiments, inventory system 320 (FIG. 3) can allow an explicit constraint that all high-velocity items be mirrored for at least $K_{TNT}$ distribution center clusters. The set of high-velocity items of the set of distinct items can be denoted by $\Omega_{high}$.

In a number of embodiments, low-velocity items may occasionally be assigned a higher-than-expected mirroring factor due to their high weight, which can correspond to high cost sensitivity. In some embodiments, inventory system 320 (FIG. 3) can allow an explicit cap on the number of mirrored distribution centers for low-velocity items. This lower bound on the number of distribution center clusters can be denoted by $K_{low}$. The set of low-velocity items of the set of distinct items can be denoted by $\Omega_{low}$.

In many embodiments, an integer programming formulation that includes the constraints described above can be formally stated as follows:

$$\min_x \sum_{i=1}^{N} \sum_{k}^{K} c_i^{(k)} x_i^{(k)} \quad (2)$$

-continued
subject to:

$$\sum_{k=1}^{K_{low}} x_i^{(k)} = 1, \quad i \in \Omega_{low}$$

$$\sum_{k=K_{TNT}}^{K} x_i^{(k)} = 1, \quad i \in \Omega_{high}$$

$$\sum_{k=1}^{K} x_i^{(k)} = 1, \quad \text{for each } i = 1, \ldots, N$$

$$\sum_{i=1}^{N} \sum_{k} k x_i^{(k)} \le M$$

$$x_i^{(k)} \in \{0, 1\}$$

In many embodiments, inventory system 320 (FIG. 3) can determine the values of $x_i^{(k)}$ in formulation 2 that satisfy the integer programming formulation. For each distinct item (i), the value of k in which $x_i^{(k)}$ is 1 can be the number of distribution center clusters in which to mirror distinct item (i). In many embodiments, inventory system 320 (FIG. 3) can solve formulation 2 using an optimization solver, such as Gurobi, or another suitable optimization solver.

In some instances, one or more distribution centers (e.g., 361-365 (FIG. 3) can have a significantly larger capacity than the rest of the distribution centers (e.g., 361-365 (FIG. 3)). For example, there can be a combo distribution center that can be able to carry all of the distinct items (i) in the set of distinct items. In such instances, special treatment of the larger distribution centers can be helpful. In essence, because this combo distribution center can carry all of the distinct items (i), it can be unnecessary to make a decision on whether or not to mirror each of the distinct items (i) in this large distribution center. If not treated as a special case, the capacity of this large distribution center can skew the determination of the mirroring factors, as the extra capacity can support at most one additional mirroring for each distinct items (i), but this capacity can be unavailable to any other distribution centers and/or distribution center clusters. As such, in some embodiments each of the distribution centers included in the clustering can have a distinct item capacity of less than the number of distinct items (i) in the set of distinct items, and those distribution centers that are able to hold all of the distinct items (i) can be removed from the mirroring factor determination.

In some embodiments, such as when the number of distinct items (i) in the set of distinct items is very large, the linear integer programming problems described above can be solved more quickly by implement a bucketing strategy for consolidating the distinct items (i). In a number of embodiments, inventory system 320 (FIG. 3) can segment the distinct item (i) into buckets based on velocity (e.g., sales demand), weight, and/or product type. In many embodiments, the distinct items (i) that are assigned to the same bucket can share the same mirroring factor. For example, a bucket include be the distinct items (i) having a sales velocity of 10-20 units per week, a weight of 5-10 pounds, and the same product type, such as "dog food." In several embodiments, with careful segmentation of velocity and weight, inventory system 320 can drastically reduce the size of the optimization problem without compromising too much optimality. With the bucketing strategy, the integer programming formulation (1) can be modified as follows:

$$\min_x \sum_{b=1}^{J} \sum_{k}^{K} c_b^{(k)} x_b^{(k)} \quad (3)$$

subject to:

$$\sum_{k=1}^{K} x_b^{(k)} = 1, \quad \text{for each } b = 1, \ldots, J$$

$$\sum_{b=1}^{J} \sum_{k}^{K} |B_b| k x_b^{(k)} \le M$$

$$x_b^{(k)} \in \{0, 1\},$$

where J is a size of the set of buckets; $|B_b|$ is a size of bucket b; and $x_b^{(k)}$ is a binary representation of whether the number of clusters (k) is the solution value of the number of clusters (k) for bucket (b).

In many embodiments, inventory system 320 (FIG. 3) can determine the values of $x_b^{(k)}$ in formulation 3 that satisfy the integer programming formulation. For each bucket (b), the value of k in which $x_b^{(k)}$ is 1 can be the number of distribution center clusters in which to mirror each distinct item (i) in bucket (b). In many embodiments, inventory system 320 (FIG. 3) can solve formulation 3 using an optimization solver, such as Gurobi, or another suitable optimization solver.

In many embodiments, the optimization solver never does not need to branch as it does for a general mixed-integer programming problem. In other words, the linear programming solution to integer programming formulations (1), (2), and/or (3) with the binary constraints ignored nonetheless have binary integer solutions. In several embodiments, the minimum extreme point where the optimal solution of the linear programming problems lies can be at an integer grid point, which can be a highly desirable feature because the complexity of the method can be practically equivalent to that of a linear programming problem. In a number of embodiments, the optimization problem can be solved in less than 30 seconds.

Figure 5:
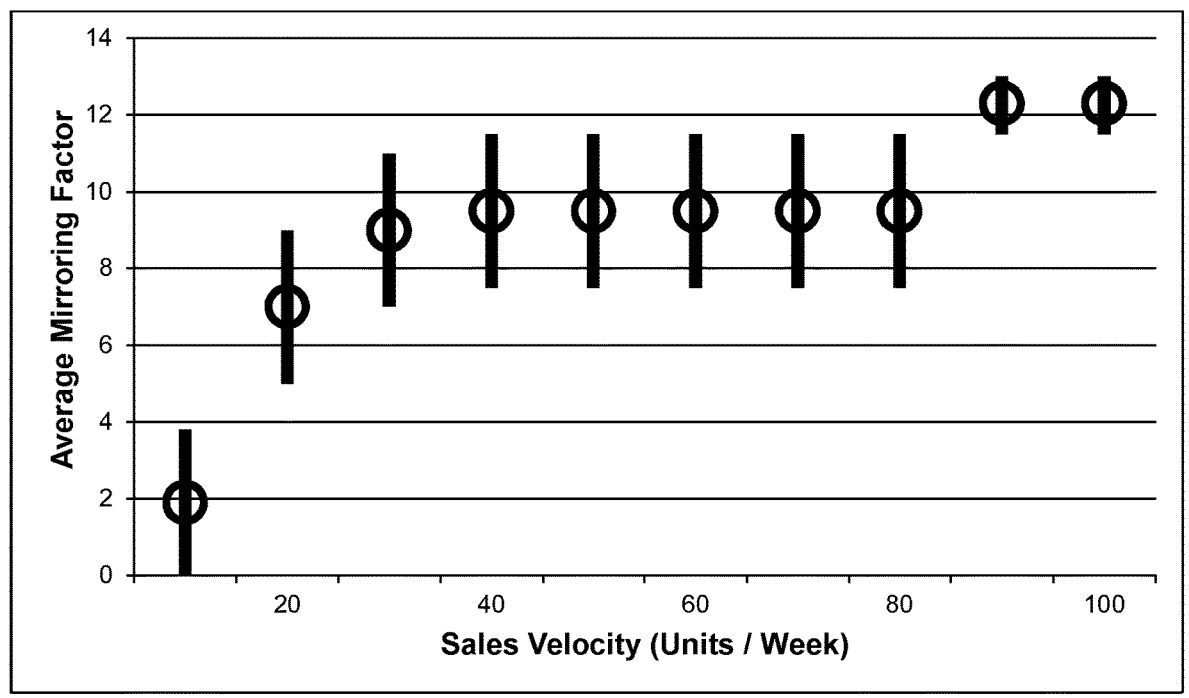
FIG. 5 illustrates a diagnostic plot for an exemplary inventory mirroring plan showing an average mirror factor for the items based on sales velocity of the items.
Figure 6:
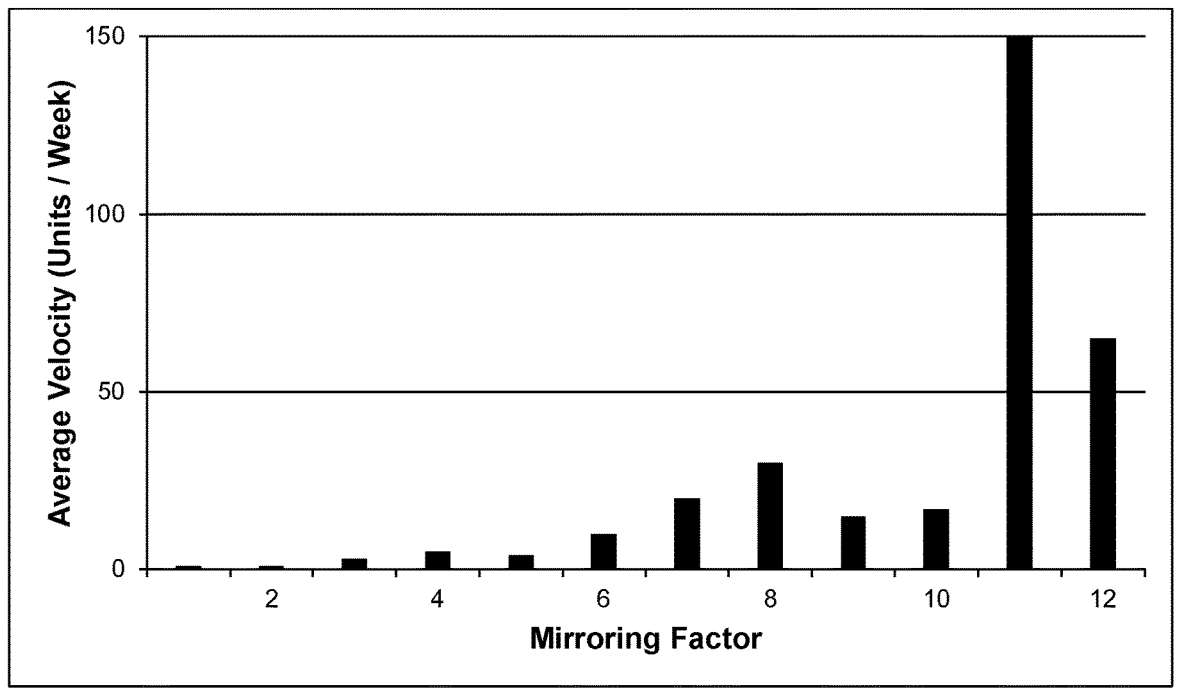
FIG. 6 illustrates a diagnostic plot for the exemplary inventory mirroring plan of FIG. 5 showing an average velocity for items in each mirroring factor.
Figure 7:
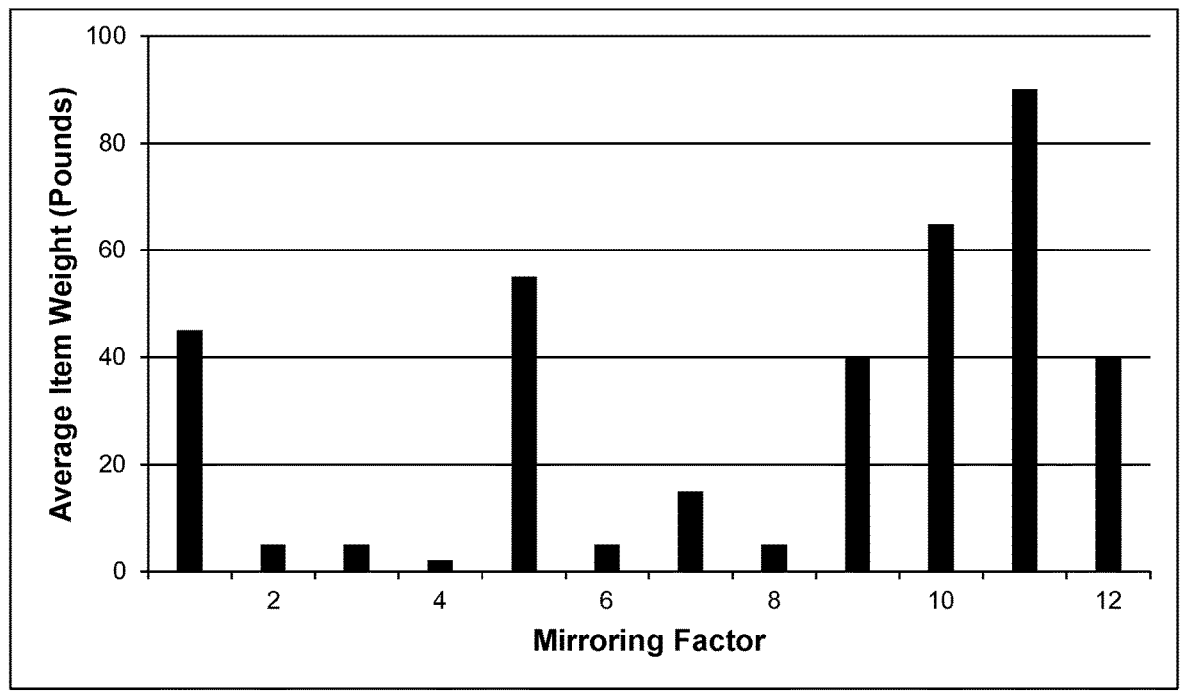
FIG. 7 illustrates a diagnostic plot for the exemplary inventory mirroring plan of FIG. 5 showing an average item weight for items in each mirroring factor.
Figure 8:
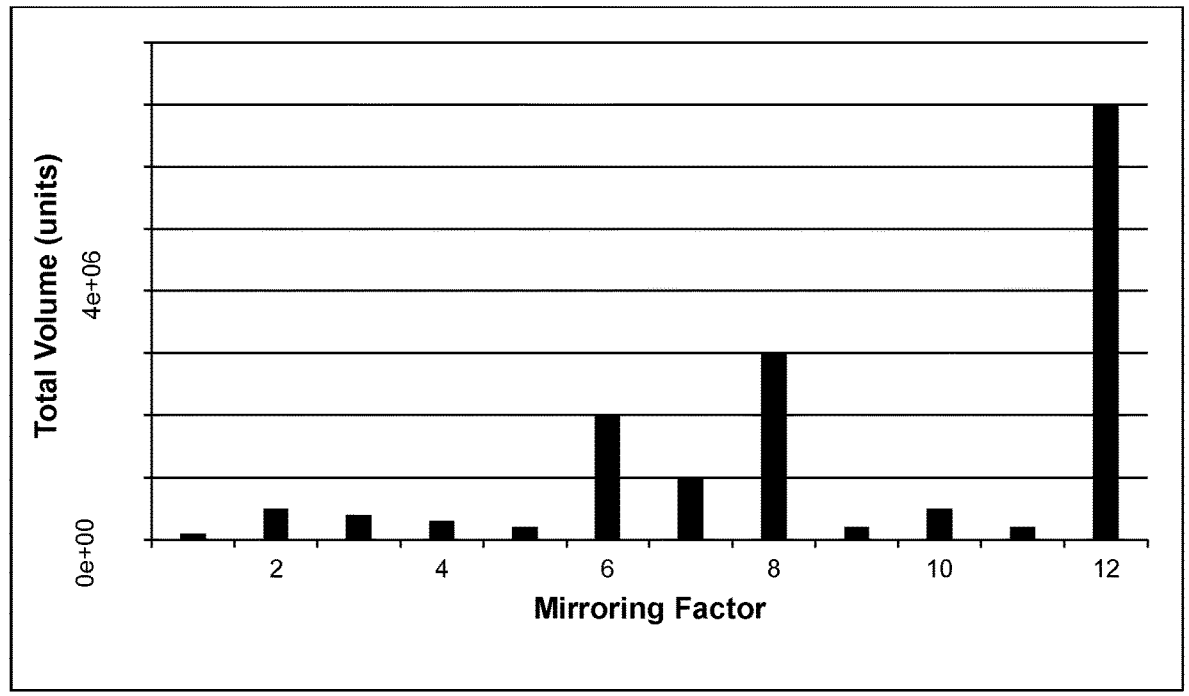
FIG. 8 illustrates a diagnostic plot for the exemplary inventory mirroring plan of FIG. 5 showing a total volume of all units for items in each mirroring factor.
Figure 9:
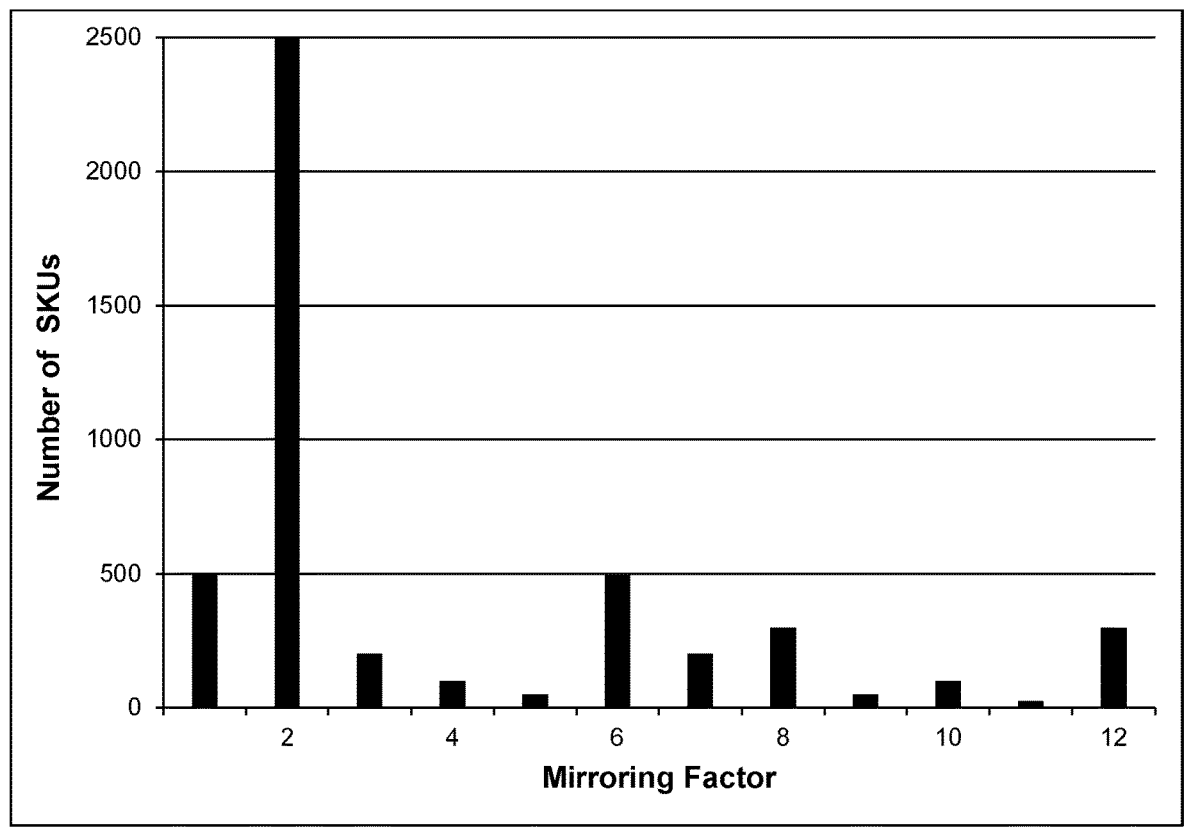
FIG. 9 illustrates a diagnostic plot for the exemplary inventory mirroring plan of FIG. 5 showing the total number of items having each mirror factor.

Turning ahead in the drawings, FIGS. 5-9 illustrates diagnostic plots to analyze various aspects of the results of an inventory mirroring plan with between 1 and 12 clusters for a set of items in general merchandise, and which were derived by using the bucketing approach in formulation (3) that considered the weight, velocity (units per week), and product type of each distinct item. FIG. 5 illustrates a diagnostic plot for the example inventory mirroring plan showing an average mirror factor for the items based on sales velocity of the items. As shown in FIG. 5, the number of mirrored distribution center clusters increases with velocity in general. FIG. 6 illustrates a diagnostic plot for the example inventory mirroring plan showing an average velocity (in units per week) for items in each mirroring factor. As shown in FIG. 6, high-velocity items are mirrored at many more distribution center clusters than low-velocity items. FIG. 7 illustrates a diagnostic plot for the example inventory mirroring plan showing an average item weight (in pounds) for items in each mirroring factor. As shown in FIG. 7, the heavier items are mirrored more, which can be due to the high cost sensitivity of the items with respect to unit increase in shipping zone distance. FIG. 8 illustrates a diagnostic plot for the example inventory mirroring plan showing a total volume of all units for items in each mirroring factor, where higher volume items are generally mirrored more. FIG. 9 illustrates a diagnostic plot for the example inventory mirroring plan showing the total number of items (SKUs) having each mirror factor. As shown in FIGS. 8-9, although most of the higher sales volume of the inventory is mirrored at more than 5 distribution center clusters, most of the distinct items (SKUs) are consolidated at 1 or 2 distribution center clusters, which can be a desired inventory positioning feature.

Figure 10:
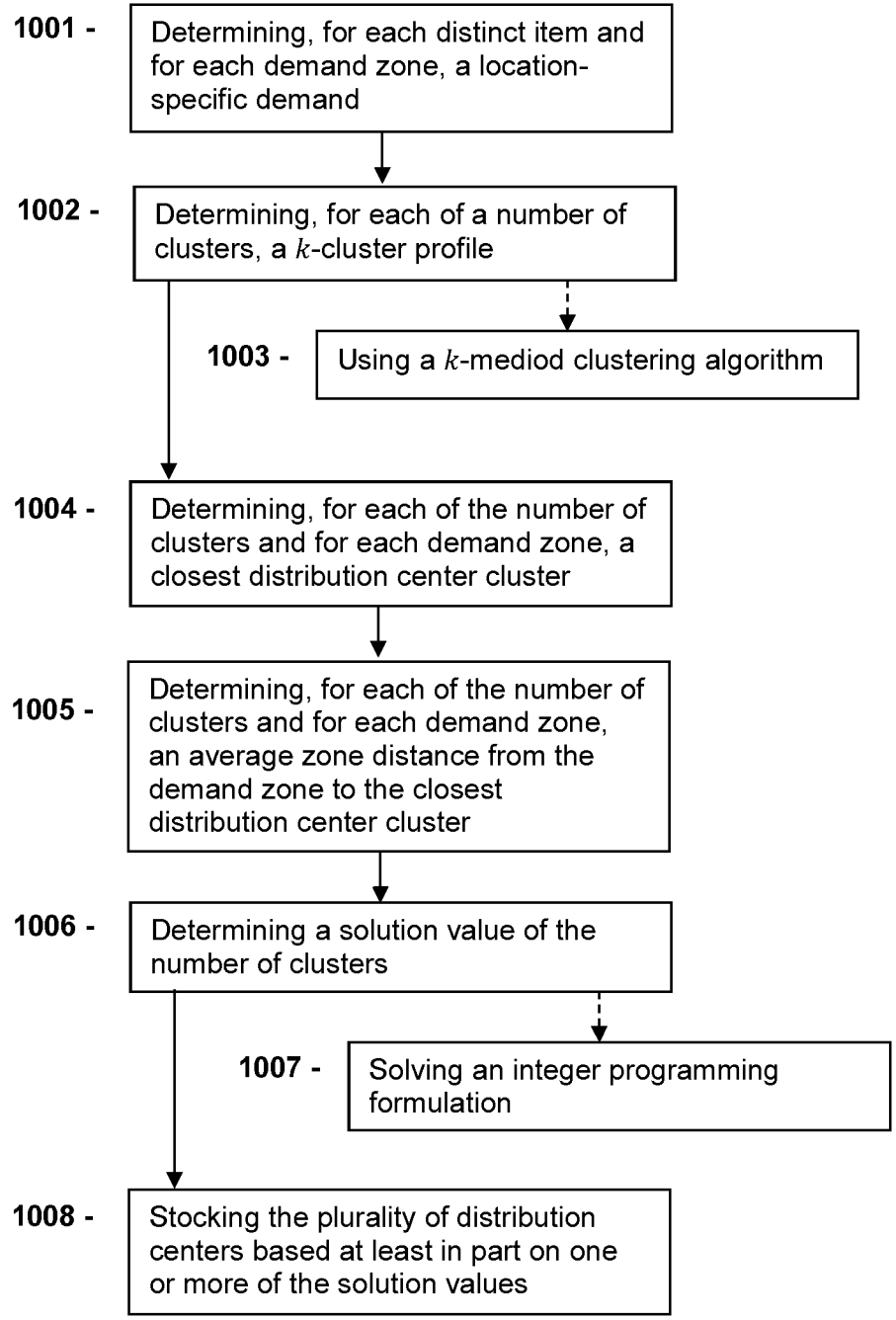
FIG. 10 illustrates a flow chart for an exemplary method of determining an inventory mirroring plan for a set of distinct items in a fulfillment network, according to an embodiment.

Turning ahead in the drawings, FIG. 10 illustrates a flow chart for a method 1000 of determining an inventory mirroring plan for a set of distinct items in a fulfillment network, according to an embodiment. The fulfillment network can be similar or identical to fulfillment network 360 (FIG. 3). Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In some embodiments, method 1000 can be implemented by inventory system 320 (FIG. 3) and/or order system 310 (FIG. 3). In a number of embodiments, the fulfillment network can include a plurality of distribution centers. The plurality of distribution centers can be similar or identical to distribution centers 361-365 (FIG. 3). In some embodiments, a quantity of the plurality of distribution centers in the fulfillment network can be greater than 30.

Referring to FIG. 10, in some embodiments method 1000 can include a block 1001 of determining via the one or more processing modules, for each distinct item (i) of the set of distinct items and for each demand zone (z) of a set of demand zones, a location-specific demand ($d_{i,z}$). In many embodiments, location-specific demand $d_{i,z}=d_i\beta_{i,z}$. In several embodiments $d_i$ can be a total demand for the distinct item (i) across the fulfillment network. In some embodiments, $\beta_{i,z}$ can be a time-static geo-demand distribution for the distinct item (i) at demand zone (z). In various embodiments, $\Sigma_z \beta_{i,z}=1$. In some embodiments, block 1001 can include determining via the one or more processing modules, for each bucket (b) of a set of buckets and for each demand zone (z) of the set of demand zones, a bucket-based location-specific demand ($d_{b,z}$).

In a number of embodiments, method 1000 can continue by including a block 1002 of determining via the one or more processing modules, for each of a number of clusters (k) ranging from 1 to a predetermined maximum number of clusters (K), a k-cluster profile that partitions the plurality of distribution centers in the fulfillment network into k distribution center clusters. In many embodiments, each of the distribution centers in the plurality of distribution centers in the fulfillment network can have a distinct item capacity of less than a size of the set of distinct items.

In some embodiments, block 1002 can include a block 1003 of using a k-medoid clustering algorithm. In many embodiments, a center of each of the k distribution center clusters can be one of the plurality of distribution centers.

In many embodiments, method 1000 can continue by including a block 1004 of determining via the one or more processing modules, for each of the number of clusters (k) ranging from 1 to the predetermined maximum number of clusters (K) and for each demand zone (z) of the set of demand zones, a closest distribution center cluster of the k distribution center clusters that is nearest to the demand zone (z).

In a number of embodiments, method 1000 can next include a block 1005 of determining via the one or more processing modules, for each of the number of clusters (k) ranging from 1 to the predetermined maximum number of clusters (K) and for each demand zone (z) of the set of demand zones, an average zone distance ($l^{(k)}(z)$) from the demand zone (z) to the closest distribution center cluster. In some embodiments, the average zone distance ($l^{(k)}(z)$) can be based on an average of zone distances from the demand zone (z) to the distribution centers from among the plurality of distribution centers in the fulfillment network that are partitioned into the closest distribution center cluster.

In many embodiments, method 1000 can subsequently include a block 1006 of determining via the one or more processing modules a solution value of the number of clusters (k) for each distinct item (i) that minimizes a sum of a total shipping cost ($c_i^{(k)}$) of each distinct item (i), subject to a total distinct item capacity (M) of the plurality of distribution centers in the fulfillment network. In several embodiments, the solution value of the number of clusters (k) can be the mirroring factor to use for the distinct item (i). In some embodiments, the total shipping cost ($c_i^{(k)}$) of the distinct item (i) can be approximated based at least in part on: (1) the average zone distance ($l^{(k)}(z)$) for each demand zone (z), (2) the location-specific demand ($d_{i,z}$) for each distinct item (i) of the set of distinct items and for each demand zone (z), and/or (3) a shipping weight ($w_i$) of the distinct item (i). In various embodiments, $c_i^{(k)}=\Sigma_z d_{i,z} c(l^k(z), w_i)$. In a number of embodiments, $c(l^k(z), w_i)$ is a unit shipping cost of distinct item (i) based on the average zone distance ($l^{(k)}(z)$) for each demand zone (z) and the shipping weight ($w_i$) of the distinct item (i).

In various embodiments, block 1006 can include determining via the one or more processing modules the solution value of the number of clusters (k) for each bucket (b) that minimizes the sum of a bucket-based total shipping cost ($c_b^{(k)}$) of each bucket (b), subject to the total distinct item capacity (M) of the plurality of distribution centers in the fulfillment network. In many embodiments, the distinct items in the set of distinct items can be segmented into the set of buckets based at least in part on one or more of a sales velocity, a weight, and/or a product type of each distinct item (i) in the set of distinct items.

In some embodiments, block 1006 can include a block 1007 of solving an integer programming formulation. In some embodiments, the integer programming formulation can be:

$$\min_x \sum_{i=1}^{N} \sum_{k}^{K} c_i^{(k)} x_i^{(k)}$$

subject to:

$$\sum_{k=1}^{K} x_i^{(k)} = 1, \text{ for each } i=1, \ldots, N$$

$$\sum_{i=1}^{N} \sum_{k}^{K} k x_i^{(k)} \leq M$$

$$x_i^{(k)} \in \{0, 1\}.$$

In many embodiments, N can be a size of the set of distinct items. In some embodiments, $x_i^{(k)}$ can be a binary representation of whether the number of clusters (k) is the solution value of the number of clusters (k) for the distinct item (i).

In other embodiments, the integer programming formulation can be:

$$\min_x \sum_{i=1}^{N} \sum_{k}^{K} c_i^{(k)} x_i^{(k)}$$

subject to:

$$\sum_{k=1}^{K_{low}} x_i^{(k)} = 1, \quad i \in \Omega_{low}$$

$$\sum_{k=K_{TNT}}^{K} x_i^{(k)} = 1, \quad i \in \Omega_{high}$$

$$\sum_{k=1}^{K} x_i^{(k)} = 1, \quad \text{for each } i = 1, \ldots, N$$

$$\sum_{i=1}^{N} \sum_{k}^{K} k x_i^{(k)} \leq M$$

$$x_i^{(k)} \in \{0, 1\},$$

In a number of embodiments, N can be a size of the set of distinct items. In some embodiments, $\Omega_{low}$ can be a subset of low-velocity items of the set of distinct items. In several embodiments, $\Omega_{high}$ can be a subset of high-velocity items of the set of distinct items. In many embodiments, $K_{TNT}$ can be a lower bound on the number of clusters (k) for the subset of high-velocity items. In a number of embodiments, $K_{low}$ can be an upper bound on the number of clusters (k) for the subset of low-velocity item. In some embodiments, $x_i^{(k)}$ can be a binary representation of whether the number of clusters (k) is the solution value of the number of clusters (k) for the distinct item (i).

In yet other embodiments, the integer programming formulation can be $$\min_x \sum_{b=1}^{J} \sum_{k}^{K} c_b^{(k)} x_b^{(k)}$$

subject to:

$$\sum_{k=1}^{K} x_b^{(k)} = 1, \quad \text{for each } b = 1, \ldots, J$$

$$\sum_{b=1}^{J} \sum_{k}^{K} |B_b| k x_b^{(k)} \leq M$$

$$x_b^{(k)} \in \{0, 1\},$$

In many embodiments, J can be a size of the set of buckets. In some embodiments, $|B_b|$ can be a size of the bucket b. In a number of embodiments, $x_b^{(k)}$ can be a binary representation of whether the number of clusters (k) is the solution value of the number of clusters (k) for the bucket (b).

In some embodiments, method 1000 can next include a block 1008 of stocking the plurality of distribution centers based at least in part on one or more of the solution values. For example, the solution value for a distinct item can be used in determining how many of the distribution center clusters in which to stock the distinct item. In many embodiments, the distinct item can be stocked at one distribution center for each of the distribution center clusters, such that the number of distribution center clusters is the solution value for the distinct item. During or after block 1008, method 1000 can include distributing products from the plurality of distribution centers and/or delivering the products from the plurality of distribution centers to customers.

Figure 11:
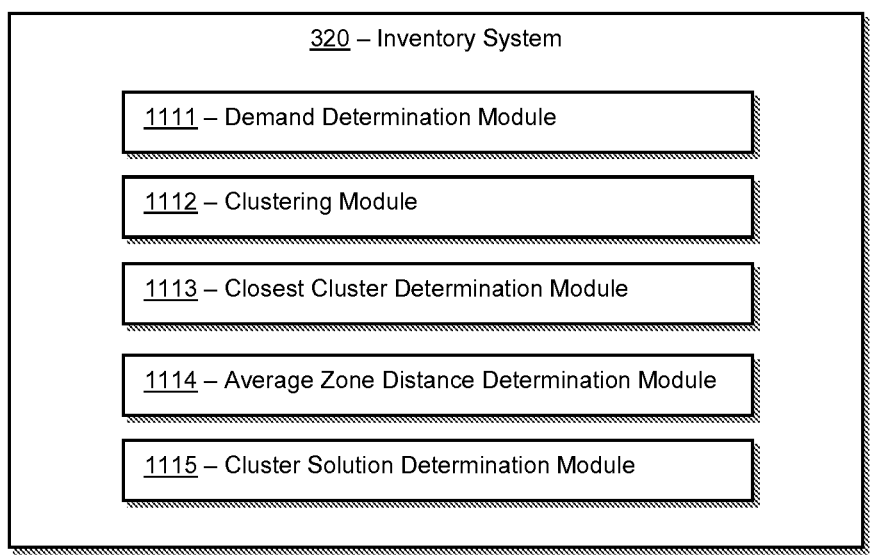
FIG. 11 illustrates a block diagram of an example of an inventory system, according to the embodiment of FIG. 3.

Turning ahead in the drawings, FIG. 11 illustrates a block diagram of inventory system 320, according to the embodiment shown in FIG. 3. Inventory system 320 is merely exemplary and is not limited to the embodiments presented herein. Inventory system 320 can be employed in many different embodiments or examples not specifically depicted or described herein. In some embodiments, certain elements or modules of inventory system 320 can perform various procedures, processes, and/or acts. In other embodiments, the procedures, processes, and/or acts can be performed by other suitable elements or modules.

In a number of embodiments, inventory system 320 can include a demand determination module 1111. In certain embodiments, demand determination module 1111 can perform block 1001 (FIG. 10) of determining, for each distinct item (i) of the set of distinct items and for each demand zone (z) of a set of demand zones, a location-specific demand ($d_{i,z}$).

In some embodiments, inventory system 320 also can include a clustering module 1112. In certain embodiments, clustering module 1112 can perform block 1002 (FIG. 10) of determining, for each of a number of clusters (k) ranging from 1 to a predetermined maximum number of clusters (K), a k-cluster profile that partitions the plurality of distribution centers in the fulfillment network into k distribution center clusters, and/or perform block 1003 (FIG. 10) of using a k-medoid clustering algorithm.

In various embodiments, inventory system 320 further can include a closest cluster determination module 1113. In certain embodiments, closest cluster module 1113 can perform block 1004 (FIG. 10) of determining, for each of the number of clusters (k) ranging from 1 to the predetermined maximum number of clusters (K) and for each demand zone (z) of the set of demand zones, a closest distribution center cluster of the k distribution center clusters that is nearest to the demand zone (z).

In many embodiments, inventory system 320 additionally can include an average zone distance determination module 1114. In certain embodiments, average zone distance determination module 1114 can perform block 1005 (FIG. 10) of determining, for each of the number of clusters (k) ranging from 1 to the predetermined maximum number of clusters (K) and for each demand zone (z) of the set of demand zones, an average zone distance ($l^{(k)}(z)$) from the demand zone (z) to the closest distribution center cluster.

In various embodiments, inventory system 320 also can include a cluster solution determination module 1115. In certain embodiments, a cluster solution determination module 1115 can perform block 1006 (FIG. 10) of determining a solution value of the number of clusters (k) for each distinct item (i) that minimizes a sum of a total shipping cost ($c_i^{(k)}$) of each distinct item (i), subject to a total distinct item capacity (M) of the plurality of distribution centers in the fulfillment network and/or perform block 1007 (FIG. 10) of solving an integer programming formulation.

Although determining an inventory mirroring plan has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-3 and 10-11 may be modified, and that the foregoing discussion of certain of these embodiments does not necessarily represent a complete description of all possible embodiments. For example, one or more of the procedures, processes, or activities of FIG. 10 may include different procedures, processes, and/or activities and be performed by many different modules, in many different orders. As another example, the modules within inventory system 320 in FIG. 11 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of determining an inventory mirroring plan for a set of distinct items in a fulfillment network, the fulfillment network comprising a plurality of distribution centers, the method being implemented at least in part via execution of computer instructions configured to run at one or more processors and configured to be stored at one or more non-transitory memory storage systems, the method comprising:

determining via the one or more processors, for each distinct item (i) of the set of distinct items and for each demand zone (z) of a set of demand zones, a location-specific demand ($d_{i,z}$), wherein the each distinct item (i) of the set of distinct items comprises high-velocity stock keeping units ("SKUs") with at least a wide geo-demand spread to be stocked at the plurality of distribution centers within the fulfillment network, wherein the high-velocity SKUs comprises a SKU having a sales volume higher than most other SKUs carried by the fulfillment network, and wherein the wide geo-demand spread comprises the SKU having a geo-demand spread wider than most other SKUs carried by the fulfillment network;

determining via the one or more processors, for each of a number of clusters (k) ranging from 1 to a predetermined maximum number of clusters (K), a k-cluster profile that partitions the plurality of distribution centers in the fulfillment network into k distribution center clusters;

determining via the one or more processors, for each of the number of clusters (k) ranging from 1 to the predetermined maximum number of clusters (K) and for each demand zone (z) of the set of demand zones, a closest distribution center cluster of the k distribution center clusters that is nearest to a first demand zone (z) of the set of demand zones;

determining via the one or more processors, for each of the number of clusters (k) ranging from 1 to the predetermined maximum number of clusters (K) and for each demand zone (z) of the set of demand zones, an average zone distance ($l^{(k)}(z)$) from the first demand zone (z) of the set of demand zones to the closest distribution center cluster;

determining, by solving an integer programming formulation, via the one or more processors a solution value of the number of clusters (k) for the each distinct item (i) of the set of distinct items that minimizes a sum of a total shipping cost ($c_i^{(k)}$) of the each distinct item (i) of the set of distinct items, subject to a total distinct item capacity (M) of the plurality of distribution centers in the fulfillment network, wherein:

$$c_i^{(k)} = \sum_z d_{i,z} c(l^k(z), w_i),$$

$c(l^k(z), w_i)$ is a unit shipping cost of the each distinct item (i) based on the average zone distance ($l^{(k)}(z)$) for each demand zone (z) of the set of demand zones and a shipping weight ($w_i$) of the each distinct item (i), wherein the integer programming formulation is solved using the one or more processors by:

using a binary variable to determine whether to mirror the each distinct item (i) of the set of distinct items in the k distribution center clusters;

determining a size (N) of the set of distinct items;

capping a maximum number of slots available in the k distribution center clusters;

generating a shipping cost resulting from stocking the each distinct item (i) of the set of distinct items at the k distribution center clusters; and applying the shipping cost to minimize the total shipping cost for the each distinct item (i) of the set of distinct items; and stocking the each distinct item (i) in a particular number of distribution centers of the plurality of distribution centers based at least in part on one or more of the solution values.

2. The method of claim 1, wherein:

determining via the one or more processors, for the each distinct item (i) of the set of distinct items and for each demand zone (z) of the set of demand zones, the location-specific demand ($d_{i,z}$) comprises:

determining via the one or more processors, for the each distinct item (i) of the set of distinct items and for each demand zone (z) of the set of demand zones, the location-specific demand ($d_{i,z}$), wherein:

$$d_{i,z} = d_i \beta_{i,z},$$

$d_i$ is a total demand for the each distinct item (i) across the fulfillment network, and $\beta_{i,z}$ is a time-static geo-demand distribution for the each distinct item (i) at the first demand zone (z) of the set of demand zones, such that $\Sigma_z \beta_{i,z} = 1$.

3. The method of claim 1, wherein:

determining via the one or more processors, for each of the number of clusters (k) ranging from 1 to the predetermined maximum number of clusters (K), the k-cluster profile that partitions the plurality of distribution centers in the fulfillment network into the k distribution center clusters comprises:

using a k-medoid clustering algorithm such that a center of each of the k distribution center clusters is one of the plurality of distribution centers.

4. The method of claim 1, wherein:
determining via the one or more processors, for each of the number of clusters (k) ranging from 1 to the predetermined maximum number of clusters (K), the k-cluster profile that partitions the plurality of distribution centers in the fulfillment network into the k distribution center clusters comprises:
determining via the one or more processors, for each of the number of clusters (k) ranging from 1 to the predetermined maximum number of clusters (K), the k-cluster profile that partitions the plurality of distribution centers in the fulfillment network into the k distribution center clusters, wherein each distribution center in the plurality of distribution centers in the fulfillment network has a distinct item capacity of less than a size of the set of distinct items.

5. The method of claim 1, wherein:
determining via the one or more processors, for each of the number of clusters (k) ranging from 1 to the predetermined maximum number of clusters (K) and for each demand zone (z) of the set of demand zones, the average zone distance ($l^{(k)}(z)$) from the first demand zone (z) of the set of demand zones to the closest distribution center cluster comprises:
determining via the one or more processors, for each of the number of clusters (k) ranging from 1 to the predetermined maximum number of clusters (K) and for each demand zone (z) of the set of demand zones, the average zone distance ($l^{(k)}(z)$) from the first demand zone (z) of the set of demand zones to the closest distribution center cluster, wherein the average zone distance ($l^{(k)}(z)$) is based on an average of zone distances from the first demand zone (z) of the set of demand zones to distribution centers from among the plurality of distribution centers in the fulfillment network that are partitioned into the closest distribution center cluster.

6. The method of claim 1, wherein:
determining, by solving the integer programming formulation, via the one or more processors the solution value of the number of clusters (k) for the each distinct item (i) of the set of distinct items that minimizes the sum of the total shipping cost ($c_i^{(k)}$) of the each distinct item (i) of the set of distinct items comprises:
determining via the one or more processors the solution value of the number of clusters (k) for the each distinct item (i) that minimizes the sum of the total shipping cost ($c_i^{(k)}$) of the each distinct item (i), wherein the total shipping cost ($c_i^{(k)}$) of the each distinct item (i) is approximated based at least in part on: (1) the average zone distance ($l^{(k)}(z)$) for each demand zone (z) of the set of demand zones, (2) the location-specific demand ($d_{i,z}$) for the each distinct item (i) of the set of distinct items and for each demand zone (z) of the set of demand zones and (3) the shipping weight ($w_i$) of the each distinct item (i).

7. The method of claim 1, wherein:
determining, by solving the integer programming formulation, via the one or more processors the solution value of the number of clusters (k) for the each distinct item (i) of the set of distinct items that minimizes the sum of the total shipping cost ($c_i^{(k)}$) of the each distinct item (i) of the set of distinct items comprises:
determining via the one or more processors the solution value of the number of clusters (k) for the each distinct item (i) by solving the integer programming formulation comprising:

$$\min_x \sum_{i=1}^{N} \sum_{k}^{K} c_i^{(k)} x_i^{(k)}$$

subject to:

$$\sum_{k=1}^{K} x_i^{(k)} = 1, \text{ for each } i = 1, \ldots, N$$

$$\sum_{i=1}^{N} \sum_{k}^{K} k x_i^{(k)} \le M$$

$$x_i^{(k)} \in \{0, 1\},$$

wherein:
N is a size of the set of distinct items; and
$x_i^{(k)}$ is a binary representation of whether the number of clusters (k) is the solution value of the number of clusters (k) for the each distinct item (i).

8. The method of claim 1, wherein:
determining, by solving the integer programming formulation, via the one or more processors the solution value of the number of clusters (k) for the each distinct item (i) of the set of distinct items that minimizes the sum of the total shipping cost ($c_i^{(k)}$) of the each distinct item (i) of the set of distinct items comprises:
determining via the one or more processors the solution value of the number of clusters (k) for the each distinct item (i) by solving the integer programming formulation comprising:

$$\min_x \sum_{i=1}^{N} \sum_{k}^{K} c_i^{(k)} x_i^{(k)}$$

subject to:

$$\sum_{k=1}^{K_{low}} x_i^{(k)} = 1, \quad i \in \Omega_{low}$$

$$\sum_{k=K_{TNT}}^{K} x_i^{(k)} = 1, \quad i \in \Omega_{high}$$

$$\sum_{k=1}^{K} x_i^{(k)} = 1, \text{ for each } i = 1, \ldots, N$$

$$\sum_{i=1}^{N} \sum_{k}^{K} k x_i^{(k)} \le M$$

$$x_i^{(k)} \in \{0, 1\},$$

wherein:
N is a size of the set of distinct items;
$\Omega_{low}$ is a subset of low-velocity items of the set of distinct items;
$\Omega_{high}$ is a subset of high-velocity items of the set of distinct items;
$K_{TNT}$ is a lower bound on the number of clusters (k) for the subset of high-velocity items;
$K_{low}$ is an upper bound on the number of clusters (k) for the subset of low-velocity items; and $x_i^{(k)}$ is a binary representation of whether the number of clusters (k) is the solution value of the number of clusters (k) for the each distinct item (i).

9. The method of claim 1, wherein:
a quantity of the plurality of distribution centers in the fulfillment network is greater than 30.

10. The method of claim 1, wherein:
determining via the one or more processors, for the each distinct item (i) of the set of distinct items and for each demand zone (z) of the set of demand zones, the location-specific demand ($d_{i,z}$) comprises determining via the one or more processors, for each bucket (b) of a set of buckets and for each demand zone (z) of the set of demand zones, a bucket-based location-specific demand ($d_{b,z}$); and
determining, by solving the integer programming formulation, via the one or more processors the solution value of the number of clusters (k) for the each distinct item (i) of the set of distinct items that minimizes the sum of the total shipping cost ($c_i^{(k)}$) of the each distinct item (i) of the set of distinct items, subject to the total distinct item capacity (M) of the plurality of distribution centers in the fulfillment network comprises determining via the one or more processors the solution value of the number of clusters (k) for each bucket (b) of the set of buckets that minimizes the sum of a bucket-based total shipping cost ($c_b^{(k)}$) of each bucket (b) of the set of buckets, subject to the total distinct item capacity (M) of the plurality of distribution centers in the fulfillment network, wherein distinct items in the set of distinct items are segmented into the set of buckets based at least in part on one or more of a sales velocity, a weight, or a product type of the each distinct item (i) in the set of distinct items.

11. The method of claim 10, wherein:
determining, by solving the integer programming formulation, via the one or more processors the solution value of the number of clusters (k) for each bucket (b) of the set of buckets that minimizes the sum of the bucket-based total shipping cost ($c_b^{(k)}$) of each bucket (b) of the set of buckets comprises:
determining via the one or more processors the solution value of the number of clusters (k) for each bucket (b) of the set of buckets by solving the integer programming formulation comprising:

$$\min_x \sum_{b=1}^{J} \sum_{k}^{K} c_b^{(k)} x_b^{(k)}$$

subject to:

$$\sum_{k=1}^{K} x_b^{(k)} = 1, \text{ for each } b = 1, \dots, J$$

$$\sum_{b=1}^{J} \sum_{k}^{K} |B_b| k x_b^{(k)} \leq M$$

$$x_b^{(k)} \in \{0, 1\},$$

wherein:
J is a size of the set of buckets;
$|B_b|$ is a size of the bucket b of the set of buckets; and
$x_b^{(k)}$ is a binary representation of whether the number of clusters (k) is the solution value of the number of clusters (k) for the bucket (b) of the set of buckets.

12. A system for determining an inventory mirroring plan for a set of distinct items in a fulfillment network, the fulfillment network comprising a plurality of distribution centers, the system comprising:
one or more processors; and
one or more non-transitory memory storage systems storing computing instructions configured to run on the one or more processors and perform:
determining, for each distinct item (i) of the set of distinct items and for each demand zone (z) of a set of demand zones, a location-specific demand ($d_{i,z}$), wherein the each distinct item (i) of the set of distinct items comprises a high-velocity stock keeping units ("SKUs") with at least a wide geo-demand spread to be stocked at the plurality of distribution centers within the fulfillment network, wherein the high-velocity SKUs comprises a SKU having a sales volume higher than most other SKUs carried by the fulfillment network, and wherein the wide geo-demand spread comprises the SKU having a geo-demand spread wider than most other SKUs carried by the fulfillment network;
determining, for each of a number of clusters (k) ranging from 1 to a predetermined maximum number of clusters (K), a k-cluster profile that partitions the plurality of distribution centers in the fulfillment network into k distribution center clusters;
determining, for each of the number of clusters (k) ranging from 1 to the predetermined maximum number of clusters (K) and for each demand zone (z) of the set of demand zones, a closest distribution center cluster of the k distribution center clusters that is nearest to a first demand zone (z) of the set of demand zones;
determining, for each of the number of clusters (k) ranging from 1 to the predetermined maximum number of clusters (K) and for each demand zone (z) of the set of demand zones, an average zone distance ($l^{(k)}(z)$) from the first demand zone (z) of the set of demand zones to the closest distribution center cluster; and
determining, by solving an integer programming formulation, a solution value of the number of clusters (k) for the each distinct item (i) of the set of distinct items that minimizes a sum of a total shipping cost ($c_i^{(k)}$) of the each distinct item (i) of the set of distinct items, subject to a total distinct item capacity (M) of the plurality of distribution centers in the fulfillment network, wherein:

$$c_i^{(k)} = \sum_z d_{i,z} c(l^k(z), w_i),$$

$c(l^k(z), w_i)$ is a unit shipping cost of the each distinct item (i) based on the average zone distance ($l^{(k)}(z)$) for each demand zone (z) of the set of demand zones and a shipping weight ($w_i$) of the each distinct item (i), wherein the integer programming formulation is solved using the one or more processors by:
using a binary variable to determine whether to mirror the each distinct item (i) of the set of distinct items in the k distribution center clusters;
determining a size (N) of the set of distinct items;

capping a maximum number of slots available in the k distribution center clusters;
generating a shipping cost resulting from stocking the each distinct item (i) of the set of distinct items at the k distribution center clusters; and
applying the shipping cost to minimize the total shipping cost for the each distinct item (i) of the set of distinct items; and
stocking the each distinct item (i) in a particular number of distribution centers of the plurality of distribution centers based at least in part on one or more of the solution values.

13. The system of claim 12, wherein:
determining, for each of the number of clusters (k) ranging from 1 to the predetermined maximum number of clusters (K), the k-cluster profile that partitions the plurality of distribution centers in the fulfillment network into the k distribution center clusters comprises:
using a k-medoid clustering algorithm such that a center of each of the k distribution center clusters is one of the plurality of distribution centers.

14. The system of claim 12, wherein:
determining, for each of the number of clusters (k) ranging from 1 to the predetermined maximum number of clusters (K) and for each demand zone (z) of the set of demand zones, the average zone distance ($l^{(k)}(z)$) from the first demand zone (z) of the set of demand zones to the closest distribution center cluster comprises:
determining, for each of the number of clusters (k) ranging from 1 to the predetermined maximum number of clusters (K) and for each demand zone (z) of the set of demand zones, the average zone distance ($l^{(k)}(z)$) from the first demand zone (z) of the set of demand zones to the closest distribution center cluster, wherein the average zone distance ($l^{(k)}(z)$) is based on an average of zone distances from the first demand zone (z) of the set of demand zones to distribution centers from among the plurality of distribution centers in the fulfillment network that are partitioned into the closest distribution center cluster.

15. The system of claim 12, wherein:
determining, by solving the integer programming formulation, the solution value of the number of clusters (k) for the each distinct item (i) of the set of distinct items that minimizes the sum of the total shipping cost ($c_i^{(k)}$) of the each distinct item (i) of the set of distinct items comprises:
determining the solution value of the number of clusters (k) for the each distinct item (i) by solving the integer programming formulation comprising:

$$\min_x \sum_{i=1}^N \sum_k^K c_i^{(k)} x_i^{(k)}$$

subject to:

$$\sum_{k=1}^K x_i^{(k)} = 1, \quad \text{for each } i = 1, \ldots, N$$

$$\sum_{i=1}^N \sum_k^K k x_i^{(k)} \leq M$$

$$x_i^{(k)} \in \{0, 1\},$$

wherein:
N is a size of the set of distinct items; and
$x_i^{(k)}$ is a binary representation of whether the number of clusters (k) is the solution value of the number of clusters (k) for the each distinct item (i).

16. The system of claim 12, wherein:
determining, by solving the integer programming formulation, the solution value of the number of clusters (k) for the each distinct item (i) of the set of distinct items that minimizes the sum of the total shipping cost ($c_i^{(k)}$) of the each distinct item (i) of the set of distinct items comprises:
determining the solution value of the number of clusters (k) for the each distinct item (i) by solving the integer programming formulation comprising:

$$\min_x \sum_{i=1}^N \sum_k^K c_i^{(k)} x_i^{(k)}$$

subject to:

$$\sum_{k=1}^{K_{low}} x_i^{(k)} = 1, \quad i \in \Omega_{low}$$

$$\sum_{k=K_{TNT}}^K x_i^{(k)} = 1, \quad i \in \Omega_{high}$$

$$\sum_{k=1}^K x_i^{(k)} = 1, \quad \text{for each } i = 1, \ldots, N$$

$$\sum_{i=1}^N \sum_k^K k x_i^{(k)} \leq M$$

$$x_i^{(k)} \in \{0, 1\},$$

wherein:
N is a size of the set of distinct items;
$\Omega_{low}$ is a subset of low-velocity items of the set of distinct items;
$\Omega_{high}$ is a subset of high-velocity items of the set of distinct items;
$K_{TNT}$ is a lower bound on the number of clusters (k) for the subset of high-velocity items;
$K_{low}$ is an upper bound on the number of clusters (k) for the subset of low-velocity items; and
$x_i^{(k)}$ is a binary representation of whether the number of clusters (k) is the solution value of the number of clusters (k) for the each distinct item (i).

17. The system of claim 12, wherein:
determining, for the each distinct item (i) of the set of distinct items and for each demand zone (z) of the set of demand zones, the location-specific demand ($d_{i,z}$) comprises determining, for each bucket (b) of a set of buckets and for each demand zone (z) of the set of demand zones, a bucket-based location-specific demand ($d_{b,z}$); and
determining the solution value of the number of clusters (k) for the each distinct item (i) of the set of distinct items that minimizes the sum of the total shipping cost ($c_i^{(k)}$) of the each distinct item (i) of the set of distinct items, subject to the total distinct item capacity (M) of the plurality of distribution centers in the fulfillment network comprises determining the solution value of the number of clusters (k) for each bucket (b) of the set of buckets that minimizes the sum of a bucket-based total shipping cost ($c_b^{(k)}$) of each bucket (b) of the set of buckets, subject to the total distinct item capacity (M) of the plurality of distribution centers in the fulfillment network, wherein distinct items in the set of distinct items are segmented into the set of buckets based at least in part on one or more of a sales velocity, a weight, or a product type of the each distinct item (i) in the set of distinct items.

18. The system of claim 17, wherein:

determining, by solving the integer programming formulation, the solution value of the number of clusters (k) for each bucket (b) of the set of buckets that minimizes the sum of the bucket-based total shipping cost ($c_b^{(k)}$) of each bucket (b) of the set of buckets comprises:

determining the solution value of the number of clusters (k) for each bucket (b) of the set of buckets by solving the integer programming formulation comprising:

$$\min_x \sum_{b=1}^{J} \sum_{k}^{K} c_b^{(k)} x_b^{(k)}$$

subject to:

$$\sum_{k=1}^{K} x_b^{(k)} = 1, \text{ for each } b = 1, \dots, J$$

$$\sum_{b=1}^{J} \sum_{k}^{K} |B_b| k x_b^{(k)} \leq M$$

$$x_b^{(k)} \in \{0, 1\},$$

wherein:

J is a size of the set of buckets;

$|B_b|$ is a size of the bucket b of the set of buckets; and $x_b^{(k)}$ is a binary representation of whether the number of clusters (k) is the solution value of the number of clusters (k) for the bucket (b) of the set of buckets.

19. The system of claim 12, wherein:

a quantity of the plurality of distribution centers in the fulfillment network is greater than 30.

20. The system of claim 12, wherein:

determining via the one or more processors, for the each distinct item (i) of the set of distinct items and for each demand zone (z) of the set of demand zones, the location-specific demand ($d_{i,z}$) comprises:

determining via the one or more processors, for the each distinct item (i) of the set of distinct items and for each demand zone (z) of the set of demand zones, the location-specific demand ($d_{i,z}$), wherein:

$d_{i,z} = d_i \beta_{i,z}$, $d_i$ is a total demand for the each distinct item (i) across the fulfillment network, and $\beta_{i,z}$ is a time-static geo-demand distribution for the each distinct item (i) at the first demand zone (z) of the set of demand zones, such that $\Sigma_z \beta_{i,z} = 1$.

* * * * *